United States Patent [19]

Mayumi et al.

[11] Patent Number: 4,720,363

[45] Date of Patent: Jan. 19, 1988

[54] METHOD OF MANUFACTURING PLASTIC MOLDING

[75] Inventors: Tohru Mayumi; Isamu Eto, both of Anjyo, Japan

[73] Assignee: Inoue MTP Kabushiki Kaisha, Aichi, Japan

[21] Appl. No.: 762,887

[22] Filed: Sep. 3, 1985

[30] Foreign Application Priority Data

Jan. 22, 1985 [JP] Japan .................................. 60-10668

[51] Int. Cl.⁴ ...................... B29C 35/12; B29C 67/22; B29C 33/10; B29B 11/14
[52] U.S. Cl. .................................... 264/26; 264/45.5; 264/51; 264/54; 264/DIG. 64; 425/812; 425/817 R
[58] Field of Search .................... 264/25, 26, 45.5, 54, 264/DIG. 64, 51; 425/812, 817 R

[56] References Cited

U.S. PATENT DOCUMENTS

| 4,203,815 | 5/1980 | Noda et al. ........................ 264/25 X |
| 4,434,251 | 2/1984 | Sasajima et al. ................... 264/25 X |
| 4,459,249 | 7/1984 | Matsuda ......................... 264/45.3 X |
| 4,524,037 | 6/1985 | Marc ...................................... 264/26 |

Primary Examiner—Philip Anderson
Attorney, Agent, or Firm—Armstrong, Nikaido, Marmelstein & Kubovcik

[57] ABSTRACT

A method of manufacturing a plastic molding of a foamable thermoplastic raw material blank or preform which contains a foaming agent by high frequency voltage heating in a molding die assembly defining a molding cavity, wherein gas discharging openings which extend through the thickness of the blank or preform are preformed in the raw material blank or preform.

9 Claims, 5 Drawing Figures

METHOD OF MANUFACTURING PLASTIC MOLDING

BACKGROUND OF THE INVENTION

1. Field of the Invention

The present invention relates to a method for manufacturing a plastic molding, and particularly to a method for manufacturing molded product having a a predetermined shape, in which a piece of material containing a foaming agent is molten and plasticized by heating through the application of high frequency voltage, so that the foaming agent dissolves.

2. Description of the Related Art

A plastic molding having an inner foamed construction which can be, for example, used as a decorative and protective elongated molding attached to a side panel or door panel of an automobile is light in weight and has a high shock-absorbing or damping effect, in comparison with a solid molding having a rigid inner construction.

Such a foamed plastic molding can be manufactured in a heating process in which a raw resin material containing a foaming agent is introduced in molding dies provided with high frequency electrodes and is heated and plasticized by the application of a high frequency voltage, so that the foaming agent dissolves to form a plastic molded product having a predetermined shape.

In the process mentioned above, the product obtained has the largest cell construction at its center core portion, since the inner foaming agent dissolves by the application of the high frequency power. The cell becomes small toward the outer periphery thereof, and the outer surface of the product forms a dense and hard shell. This kind of separate construction consisting of a foamed core and a hard shell is advantageous, particularly when it is used to make a decorative and protective molding for an automobile.

However, the conventional manufacturing process mentioned above has a drawback that gas which is issued from the raw resin material when foaming takes place and an air which exists in a molding cavity defined by the molding dies tend to remain in the cavity without being completely discharged therefrom, thus resulting in the production of so-called air marks or undesirable small depressions on the outer surface of the product. This results in the bad appearance of the product. Particularly, an elongated molded product, such as a decortive and protective molding for an automobile often has the disadvantage of an ugly appearance, since passages for which the gas and the air to escape from are limited.

SUMMARY OF THE INVENTION

The primary object of th present invention is, therefore, to provide a method for manufacturing a foamed molding which has a good appearance, in which gas which otherwise would remain in the molding cavity in the course of foaming can be discharged from the cavity.

Still another object of the present invention is to provide a method for discharging the gas in a process of manufacturing an elongated molding having an inner recess, i.e. an inner concave configuration.

According to the present invention, in order to achieve the objects mentioned above, there is provided a method of manufacturing a plastic molding in which a raw material containing a foaming agent is molten and plasticized by heating by the application of high frequency voltage, so that the foaming agent dissolves, wherein the improvement comprises preforming gas discharging openings in the raw material, said openings extending through the raw material from the side that defines the molding cavity and the opposite rear side thereof.

BRIEF DESCRIPTION OF THE DRAWINGS

The invention will be described below in detail with reference to the accompanying drawings, in which.

DESCRIPTION OF THE PREFERRED EMBODIMENT

Figure 1:
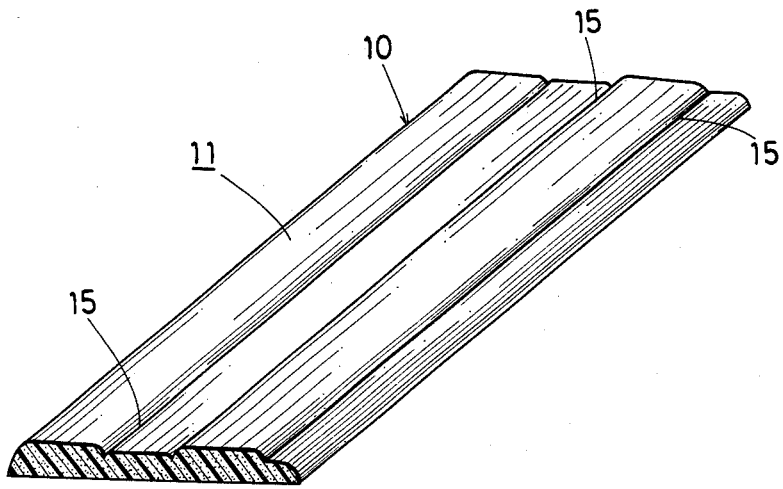
FIG. 1 is a partial perspective view of a plastic molding for an automobile obtained by the present invention.

The molding 10 shown in FIG. 1 can be used as an elongated plastic molding for protection and decroation which can be attached to a side panel or door panel of an automobile. The molding 10 has continuous recesses or grooves 15 extending along the length thereof for the purpose of decoration and shock absorbing effect.

Figure 2:
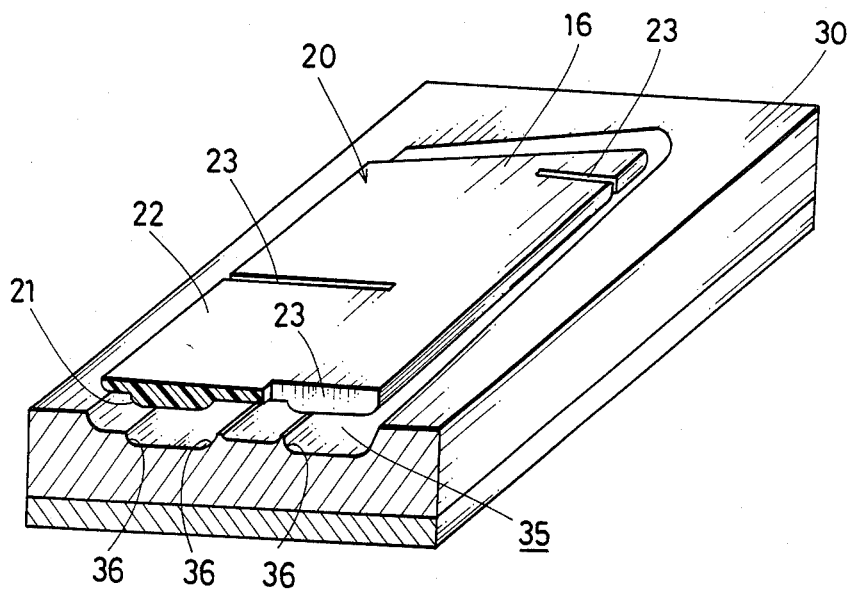
FIG. 2 is a partial perspective view of a molding die in which the raw material is charged, according to the present invention.

FIG. 2 shows a molding die 30 which is adapted to mold the molding 10 made of a raw material 20. The raw material 20 contains therein a foaming agent which foams when a high frequency voltage is applied.

The raw material 20 has a base resin of, for example, vinyl chloride polymer or its copolymer of vinyl acetate or the like, and an additive or additives, such as a plasticizer, a stabilizer, a coloring agent, or a filler, which is or are mixed in the base resin to make a sol mixture. A foaming agent is added and mixed in the sol mixture into a predetermined shape corresponding to the shape of a molding cavity 35 of the molding die 30.

It will be appreciated that if the molding product is elongate, the raw material 20 can be made by a continuous extrusion molding process per se known.

The molding die 30 has a molding cavity 35 which has a shape corresponding to the outer profile 11 of the molding 10.

Preferably, the molding 10 has finished terminal ends 16 which eliminate the necessity of end pieces which otherwise would be attached to the terminal ends of the molding product only for aesthetic appearance.

According to the present invention, the raw material 20 has gas escaping or discharging openings 23 which extend through the raw material 20 from the lower or front side 21 that defines the molding cavity 35 to the opposite upper or rear side 22 thereof and which are preformed in the raw material 20.

The gas escaping or gas discharging openings 23 are adapted to discharge the air which originally exists in the cavity and the gas which is issued from the raw material during foaming, out of the cavity, both otherwise would remain in the cavity 35. Accordingly, it is preferably that the openings 23 are formed in the portions of the raw material 20 where the air and the produced gas tend to be collected and remained, namely in the portions adjacent to the round corners 36 of the recesses 35.

Figure 3:
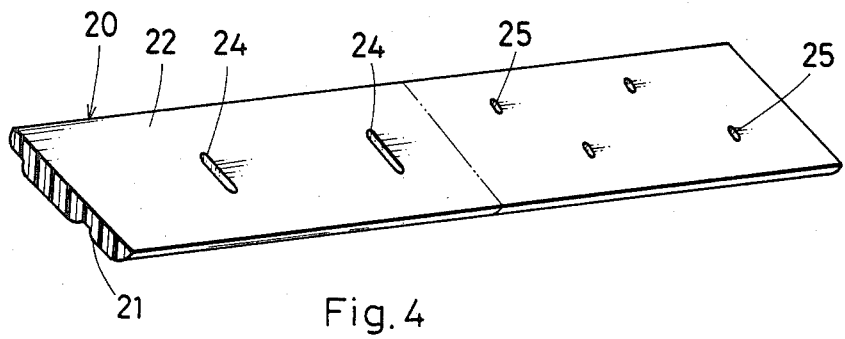
FIG. 3 is a partial perspective view of a raw material used in the present invention.
Figure 4:
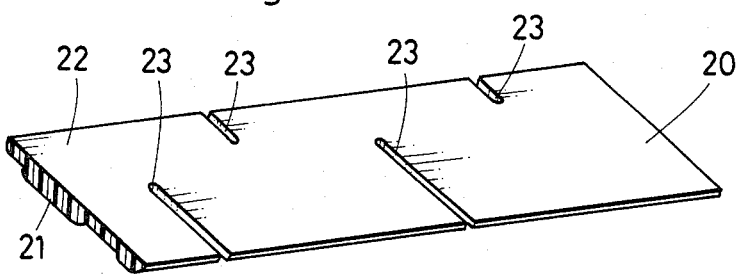
FIG. 4 is a partial perspective view of a raw material different from the raw material shown in FIG. 3, used in the present invention.

The openings 23 can be of any shape, for example, slits 23, slots or elongated holes 24, or circular holes 25, as shown in FIGS. 2, 3, and 4. The openings 23 can be made by a cutter or a punching press. It should be noted that the slit like openings 23 which open to the side edges of the raw material 20 are most advantageous in a gas discharging effect and also can be made in an easy cutting operation.

Furthermore, in case of an elongated raw material 20, it is advisable to form the slits 23 in an alternative arrangemant in which the slits 23 extend from the alternate opposite sides of the raw material 20 in the direction of the width thereof.

It should be noted that the openings 23 (24 and 25) disappear when the product is molded since the raw material which is molten and plasticized by heating flows in the openings 23, so that the latter are clogged and disappear. For this end, the width of the openings 23 is preferably 1 to 2 mm at the largest.

The extent of foaming of the raw material 20 is such that the specific gravity thereof is 0.6 to 1.0 and preferably 0.7 to 0.8.

Figure 5:
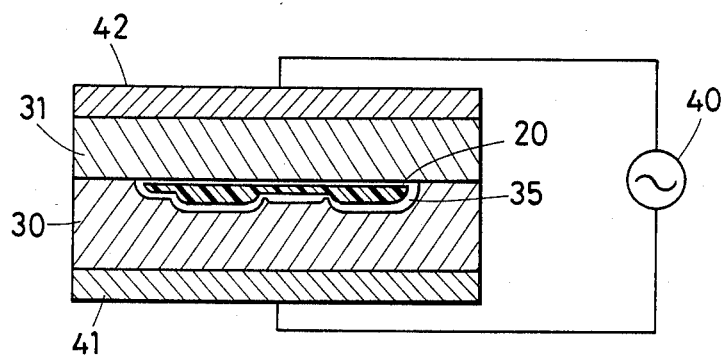
FIG. 5 is a side sectional view of a molding apparatus having a molding die assembly in which a raw material is loaded, according to the present invention.

FIG. 5 shows a molding device having a molding die assembly consisting of an upper die 31 and a lower die 30 which define a molding cavity 35 therebetween. The dies 30 and 31 are provided with high frequency electrodes 41 and 42, respectively, which are connected to a high frequency voltage source 40, so that the raw material 20 located in the cavity 35 is heated by the application of a high frequency power to the electrodes 41 and 42.

By the application of the high frequency voltage to the electrodes 41 and 42, the raw material 20 which is heated is molten and plasticized, so that the foaming agent contained in the raw material 20 dissolves and foams, resulting in an expansion of the molten raw material 20 in the cavity 35. Thus, a molded product having a shape corresponding to the shape of the cavity 35 can be obtained.

As can be seen from the aforementioned discussion, the gas existing during foaming can be discharged from the cavity through the gas discharging openings 23 etc., thus resulting in prevention of the gas from remaining in the cavity.

Therefore, according to the present invention, the product thus obtained has neither air marks nor depressions (concavities) which have often appeared on the outer surface of the conventional molded product of the prior art, as mentioned before. Accordingly, a molded product obtained by the present invention has a good appearance.

The present invention can be advantageously used in particular to make an elongated molding having an inner recess(es) or a concave inner configuration of a plastic material having a foaming agent which foams when heated.

We claim:

1. A method of manufacturing a foamed plastic molding having a predetermined shape and formed from a foamable plastic raw material blank or preform containing a foaming agent comprising placing a foamable thermoplastic resin blank or preform having preformed gas discharge openings provided therein, the gas discharge openings extending through the thickness of the blank or preform, into the mold cavity a molding die assembly defining a molding cavity having the predetermined shape of the foamed plastic molding; the heating said black or preform by the application of high frequency voltage to soften and foam said blanks or preform and, wherein air originally trapped in the mold cavity and gas issued during the foaming is discharged from the mold cavity through said gas discharge openings preformed in the blank or preform which extend through the thickness of the raw material from the lower side thereof that is adjacent to the lower surface of the molding cavity to the opposite upper side of the foamable plastic raw material blank or preform.

2. A method according to claim 1, wherein said molding cavity has a recessed profile and wherein said gas discharging openings are located adjacent to corner portions of the recessed profile of the molding cavity when the raw material preform is put in the molding cavity.

3. A method according to claim 1, wherein said gas discharging openings are in the form of slits.

4. A method according to claim 3, wherein said gas discharging slits open to side edges of the plastic raw material preform in the direction of the width thereof.

5. A method according to claim 1, wherein said gas discharging openings are in form of holes.

6. A method according to claim 5, wherein said holes are elongate.

7. A method according to claim 1, wherein said plastic raw material blank or preform is premolded by an extrusion molding process.

8. A method according to claim 3, wherein said gas discharging slits are distributed in the raw material blank or preform in an alternate arrangement in which the slits alternately extend from the opposite side edges of the raw material blank or preform when viewed in a plain view.

9. A method according to claim 1, wherein the width of the gas discharge openings is less than about 2 mm.

* * * * *